(12) United States Patent
Wang et al.

(10) Patent No.: US 10,581,998 B2
(45) Date of Patent: Mar. 3, 2020

(54) METHOD FOR BLUETOOTH COMMUNICATION, ELECTRONIC DEVICE AND BLUETOOTH SYSTEM

(71) Applicant: SMARTECH WORLDWIDE LIMITED, Tortola (VG)

(72) Inventors: Mid Wang, Hong Kong (CN); Yunhe Fu, Hong Kong (CN); Tony Xie, Hong Kong (CN)

(73) Assignee: SMARTECH WORLDWIDE LIMITED, Tortola (VG)

( * ) Notice: Subject to any disclaimer, the term of this patent is extended or adjusted under 35 U.S.C. 154(b) by 0 days.

(21) Appl. No.: 15/992,123

(22) Filed: May 29, 2018

(65) Prior Publication Data

US 2018/0352047 A1    Dec. 6, 2018

(30) Foreign Application Priority Data

Jun. 1, 2017    (CN) .......................... 2017 1 0406238

(51) Int. Cl.
| | | |
|---|---|---|
| H04L 29/08 | (2006.01) | |
| H04W 4/80 | (2018.01) | |
| H04W 88/02 | (2009.01) | |
| H04W 84/20 | (2009.01) | |
| H04W 72/04 | (2009.01) | |
| H04L 1/16 | (2006.01) | |
| H04W 52/02 | (2009.01) | |

(52) U.S. Cl.
CPC .......... *H04L 67/2842* (2013.01); *H04W 4/80* (2018.02); *H04W 88/02* (2013.01); *H04W 84/20* (2013.01); *Y02D 70/10* (2018.01); *Y02D 70/14* (2018.01)

(58) Field of Classification Search
CPC .... H04L 67/2842; H04W 4/80; H04W 88/02; H04W 84/20; Y02D 70/14; Y02D 70/10
USPC .......................................................... 370/310
See application file for complete search history.

(56) References Cited

U.S. PATENT DOCUMENTS

| | | | |
|---|---|---|---|
| 2004/0003311 A1* | 1/2004 | Jones ..................... | G06F 1/3203 713/320 |
| 2012/0058727 A1 | 3/2012 | Cook et al. | |
| 2013/0316642 A1* | 11/2013 | Newham ........... | H04W 52/0206 455/11.1 |
| 2017/0245204 A1* | 8/2017 | Kumar .................... | H04W 4/80 |
| 2018/0146478 A1* | 5/2018 | Kim ....................... | H04W 76/14 |

FOREIGN PATENT DOCUMENTS

| | | |
|---|---|---|
| CN | 1836410 A | 9/2006 |
| CN | 106792454 A | 5/2017 |
| CN | 106878920 A | 6/2017 |

* cited by examiner

*Primary Examiner* — Yemane Mesfin
*Assistant Examiner* — Intekhaab A Siddiquee (57) ABSTRACT

A method for Bluetooth communication includes: in Bluetooth communication, allocating bandwidth resources as a first bandwidth resource for communication with a data source device and a second bandwidth resource for communication with a slave device; in the communication with the data source device, receiving and caching data from the data source device; in the communication with the slave device, determining whether the volume of the cached data is less than a first threshold; and if the data volume of the cached data is less than the first threshold, using at least a portion of the second bandwidth resource for the communication with the data source device.

11 Claims, 3 Drawing Sheets

METHOD FOR BLUETOOTH COMMUNICATION, ELECTRONIC DEVICE AND BLUETOOTH SYSTEM

CROSS-REFERENCE TO RELATED APPLICATIONS

The present disclosure claims priority to Chinese Patent Application No. 201710406238.8, filed with the Chinese Patent Office on Jun. 1, 2017, titled "METHOD AND APPARATUS FOR BLUETOOTH COMMUNICATION, BLUETOOTH SYSTEM AND BLUETOOTH DEVICE", the entire contents of which are incorporated herein by reference.

TECHNICAL FIELD

The present disclosure relates to the technical field of Bluetooth communications, and in particular, relates to a method for Bluetooth communication, an electronic device, and a Bluetooth system.

BACKGROUND

Various types of wireless transmission devices, for example, smart phones, Bluetooth headphones, MP3 players, and the like, have been extensively applied. Most wireless transmission devices support Bluetooth transmission of audios and other types of data. In the Bluetooth protocol (A2DP profile), one data output source (for example, a smart phone, an MP3 player or the like) may be only connected to one audio playback device, and transmit data via Bluetooth to an audio playback device for playback.

In some scenarios, the data output source needs to transmit data to two or more than two audio playback devices. For example, the stereo headphone requires that left and right-channel playback devices are both wirelessly connected to the data output source. In case of data reception, the playback device in one channel (for example, the left headphone) only acts as a master device to receive the data transmitted by the data output source. Then the data is transmitted to the playback device in the other channel (that is, a slave device) via Bluetooth or other non-Bluetooth transmission protocols. To reduce the data volume to be forwarded by the master headphone, the slave device may also acquire, by using such working modes as data interception and the like, all or a portion of the data output by the data output source.

SUMMARY

An embodiment of the present disclosure provides a method for Bluetooth communication. The method includes: in Bluetooth communication, allocating bandwidth resources as a first bandwidth resource for communication with a data source device and a second bandwidth resource for communication with a slave device; in the communication with the data source device, receiving and caching data from the data source device; in the communication with the slave device, determining whether the volume of the cached data is less than a first threshold; and if the data volume of the cached data is less than the first threshold, using at least a portion of the second bandwidth resource for the communication with the data source device.

Another embodiment of the present disclosure provides an electronic device. The electronic device includes: a memory, a communication module and a processor coupled to the memory and the communication module; the memory storing instructions that are executable by the processor, wherein execution of the instructions by the processor causes the processor via the communication module to: allocating bandwidth resources as a first bandwidth resource for communication with a data source device and a second bandwidth resource for communication with a slave device, in Bluetooth communication; receiving and caching data from the data source device, in the communication with the data source device; determining whether the volume of the cached data is less than a first threshold, in the communication with the slave device; and if the data volume of the cached data is less than the first threshold, using at least a portion of the second bandwidth resource for the communication with the data source device.

Still another embodiment of the present disclosure provides a Bluetooth system. The Bluetooth system includes a master device and a slave device; wherein in a first period of Bluetooth communication, the slave device is configured to acquire data from a data source device by means of data interception, the master device is configured to be connected via Bluetooth, and receive and caches the data from the data source device; in a second period of the Bluetooth communication, the master device is configured to establish a Bluetooth connection with the slave device for receiving slave device data packet reception information from the slave device, determining a data packet missed by the slave device according to the slave device data packet reception information and sending the missing data packet to the slave device. The master device is configured to determine whether the volume of the cached data is less than a first threshold; and if the data volume of the cached data is less than the first threshold, lengthening the first period by shortened the second period.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

In order to make the objectives, technical solutions, and advantages of the present disclosure clearer, the present disclosure is further described in detail below by reference to the embodiments and the accompanying drawings. It should be understood that the specific embodiments described herein are only intended to explain the present disclosure instead of limiting the present disclosure.

Bluetooth is a point-to-point or point-to-multipoint topological structure. However, interactions therebetween are all based on a physical channel. Point-to-multipoint may share one physical channel. In a piconet based on the same physical channel, a hardware device may serve as a master device or a slave device. The specific device role may be defined by the device randomly, to implement the corresponding control function (one piconet has only one master device). Nevertheless, an intersection is allowed to exist between different piconets. That is, the slave device in one piconet may serve as the master device on another piconet.

In Bluetooth, a Bluetooth device does not need to practice all the Bluetooth specifications. For compatibility between different Bluetooth devices, some Bluetooth application-specific profiles are defined in the Bluetooth specifications, which are used to define how to implement a connection or application between Bluetooth devices.

The Advanced Audio Distribution Profile (A2DP) is a subset in the above described Bluetooth profiles. The A2DP is dedicated to transfer of stereo audios via the Bluetooth. In a case where two Bluetooth devices both support the specifications, the stereo audios may be transferred via the Bluetooth.

Figure 1:
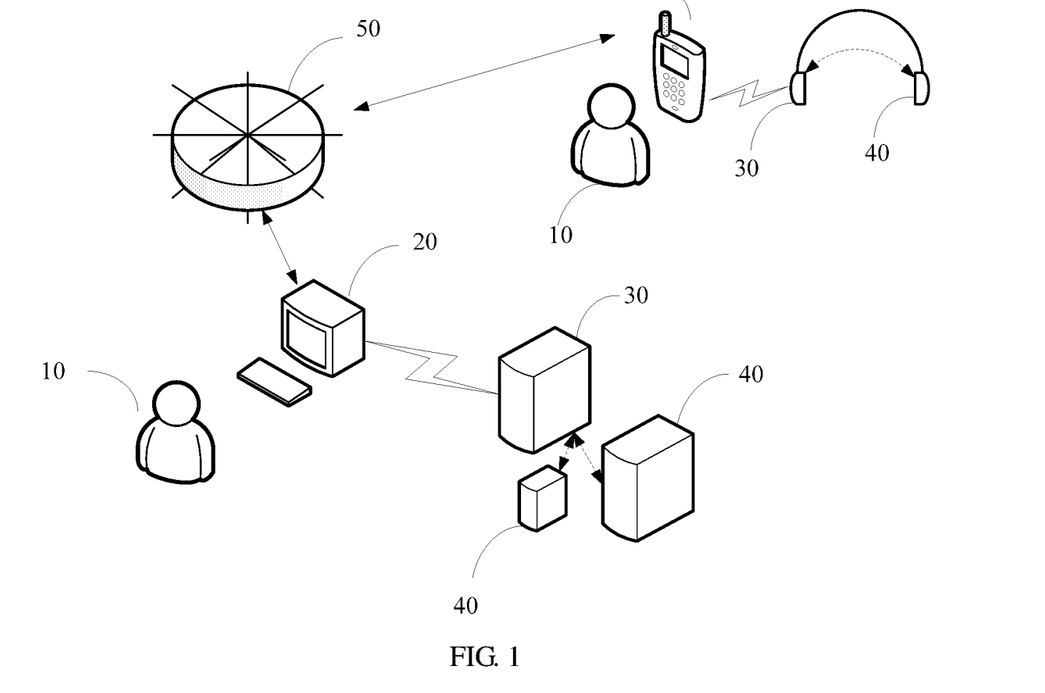
FIG. 1 is a schematic diagram of an application environment according to an embodiment of the present disclosure.

FIG. 1 illustrates an application environment where stereo audios are transferred via the A2DP according to an embodiment of the present disclosure. As illustrated in FIG. 1, the application environment includes: a user 10, a data output device 20, a multi-channel playback device (including a first audio playback device 30 and a second audio playback device 40), and a network 50.

The user 10 may be a group having the same or similar operation behaviors in any number, for example, a family, a work group or individuals. The user 10 may interact with the data output device 20 and/or the multi-channel playback device by using one or a plurality of user interaction device of any suitable type, for example, a mouse, a keypad, a remote control, a touch screen, a motion sensing camera, or a smart wearable device, input instructions or control the data output device 20 and/or the multi-channel playback device to perform one or a plurality of operations, for example, a stereo audio playback operation.

The data output device 20 may be a suitable electronic device that supports A2DP and provides one or a plurality of audio contents, for example, a smart phone, a tablet computer, an MP3 player, a personal computer, a laptop computer, a personal audio device, a CD player, or any other smart/non-smart terminal devices. The data output device 20 is coupled to at least one storage medium configured to store audio data, and acquires audio data. The data output device 20 may also be a combination of one or a plurality of electronic devices, for example, a smart phone and a digital-to-analog converter (DAC) connected thereto.

The multi-channel playback device may include a first audio playback device 30 and a second audio playback device 40. The multi-channel playback device may be a suitable electronic device that supports the A2DP and is capable of playing audio data, for example, a stereo headphone, a 2.1 channel speaker, a 5.1 channel audio device, a stereo speaker or any other suitable speaker groups. The first audio playback device 30 and the second audio playback device 40 are merely used to represent speaker parts for playback in different sound channels. For example, for a stereo headphone, the first audio playback device 30 may be a left-channel headphone and the second audio playback device 40 may be a right-channel headphone, or for a 2.1 channel speaker, the first audio playback device 30 may be a bass speaker and the second audio playback device 40 is a left-channel and right-channel speaker.

The first audio playback device 30 is communicatively connected to the second audio playback device 40 via a Bluetooth module, for data forwarding therebetween. In some embodiments, other communication modules may also be configured for communicative connection, for example, a WiFi module.

The data output device 20 may establish a Bluetooth connection with the multi-channel audio playback device according to a user instruction, and transfer audio data based on A2DP. In this embodiment, the data output device 20 may establish a Bluetooth connection with the first audio playback device 30, and serve as a master device to send corresponding stereo audio data. The first audio playback device 30 may also forward the stereo audio data to the second audio playback device 40 via Bluetooth communication for playback.

The network 50 may be a suitable wired or wireless network that implements communication between two electronic devices, for example, the Internet, a local area network or a cabled network. The data output device 20 has at least one network interface, establishes a communication connection with the network 50, and acquires corresponding audio data or instructions from the network 50. Nevertheless, the data output device 20 may also have at least one local storage device, and acquire corresponding audio data from the local storage device. In some other embodiments, some devices may be added or removed according to the actual needs. For example, the network 50 may be removed or an additional user interaction device may be added.

In a stereo audio transmission process, the user 10 sends an instruction to the data output device 20 (for example, a smart phone). Under A2DP, the data output device 20 sends audio data to the first audio playback device 30 via Bluetooth according to the user's instruction.

Meanwhile, the second audio playback device 40 may work in a data interception mode, and acquire audio data sent by the data output device 20 by means of data interception. The second audio playback device 40 intercepts relevant communication information that is desired, for example, channel, frequency, time sequence and the like. The second audio playback device 40 may be connected to the first audio playback device 30, and acquire the information from the first audio playback device 30.

In addition, the data interception is a working mode that allows unidirectional acquisition of data packets delivered by the data source device in the Bluetooth communication process. Therefore, the data interception is not enable to use the means for ensuring the data integrity during data transmission, such as handshake, Bluetooth baseband processing or retransmission or the like mechanism. The missing data of audio playback device 40 also needs to acquire from the first audio playback device 30 by the connection to the first audio playback device 30.

During audio playback, the Bluetooth module of the first audio playback device 30 needs to be multiplexed in a time-sharing manner, wherein one portion of time is elapsed for the slave device of the data source device to acquire and cache partially received audio data, and another portion of time is elapsed for the master device of the second audio playback device 40 to receive information from the second audio playback device 40 or forward desired information (for example, the missing data packet) to the second audio playback device 40.

The first audio playback device 30 may switch between the functions implemented by the Bluetooth communication module according to the actual needs or predetermined conditions, so as to determine allocation of the Bluetooth bandwidth resources. For example, 50% of the bandwidth resources are allocated for the communication with the data source device and acquiring and caching the audio data, by setting the switching time between the functions implemented by the Bluetooth communication module. The remaining 50% of the bandwidth resources are assigned to communicate with the second audio playback device 40.

For ease of description, the first audio playback device 30 receiving the audio data output by the data output device may be referred to as the master device, and the remaining second audio playback devices 40 receiving the audio data forwarded by the master device may be referred to as slave devices. In the process of outputting stereo audio process by the data output device 20, any one audio playback device may be selected from a multi-channel audio playback device to establish a Bluetooth communication connection (that is, the master device), and transmit the stereo audio data based on A2DP.

In the application environment as illustrated in FIG. 1, on one hand, regarding the data output device 20 and the first audio playback device 30, the data output device 20 serves as the master device. On the other hand, regarding the first audio playback device 30 and the second audio playback device 40, the first audio playback device 30 serves as the master device.

The terms "master device" and "slave device" used herein are merely referred to a roles of hardware devices in the piconet. In practice, the roles of the devices may be exchanged according to actual needs. For example, a second audio playback device may also serve as the master device in terms of role, which receives the stereo audio data output by the data output device.

Although FIG. 1 only illustrates two users 10, two data output devices 20, two first audio playback devices 30, and three second audio playback devices 40, a person skilled in the art should understand that in practical application, the application environment may include more users 10, more data output devices 20, more first audio playback devices 30 or more second audio playback devices 40.

In addition, the application environment according to the embodiment as illustrated in FIG. 1 is described using A2DP-based Bluetooth audio transmission as an example. However, the method for forwarding Bluetooth data according to the embodiment of the present disclosure may also be applied to any suitable scenario where data needs to be transmitted from one data source output device to a plurality of different data receiving devices via Bluetooth transmission, but is not limited to application of stereo audio transmission based on A2DP.

In the process of multiplexing the Bluetooth communication module of the first audio playback device 30 in the time-sharing manner, by additionally setting a judgment criterion or threshold or the like, the functions implemented by the Bluetooth communication module may be dynamically adjusted to accommodate different actual communication situations.

Figure 2:
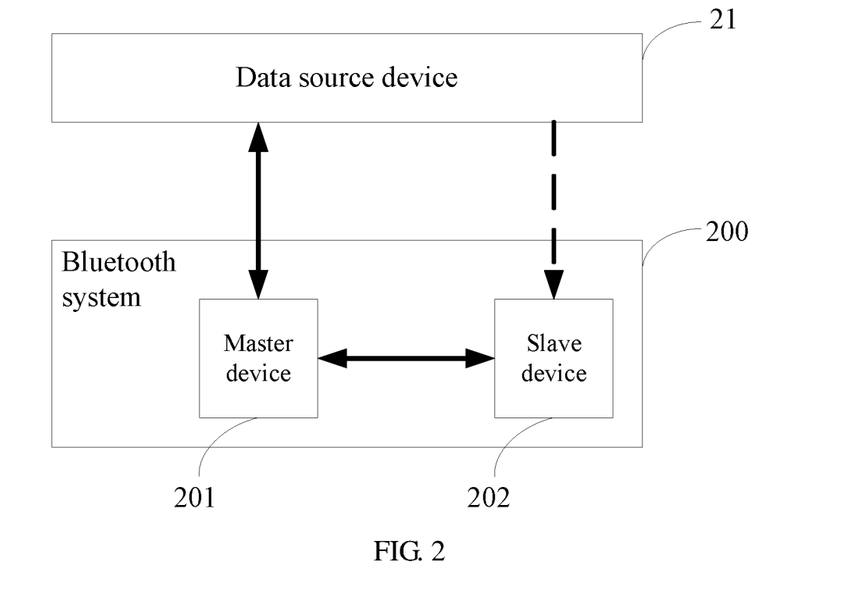
FIG. 2 is a schematic structural diagram of a Bluetooth system according to an embodiment of the present disclosure.

In some embodiments, as illustrated in FIG. 2, the multi-channel audio playback apparatus is generally an integral device, for example, a stereo headphone, which pertains to a complete Bluetooth system 200. In the Bluetooth system, a speaker acting as the master device and a speaker acting as the slave device are involved.

In the process of maintaining the Bluetooth connection with an external data source device (for example, a smart phone) 21 and transmitting data, the entire Bluetooth system may support two working modes to multiplex the Bluetooth communication module of the master device in the time-sharing manner.

In a first working mode, a master device 201 establishes a Bluetooth communication connection with the data source device, and normally acquires data delivered from the data source device. In the meantime, a slave device 202 obtains unidirectionally the data delivered by the data source device by means of data interception.

In a second working mode, the master device 201 establishes a communication connection with the slave device 202, and interacts with the slave device to determine the data desired by the slave device and forward the data desired by the slave device (for example, a missing data packet during data interception).

In the second working mode, the Bluetooth system determines the quality of the communication between the Bluetooth system and the external data source device by judging whether the volume of the cached data is less than a first threshold. If the volume of the cached data is less than a predetermined first threshold, the Bluetooth system is switched to the first working mode as early as possible, and more Bluetooth bandwidth resources are allocated to ensure the integrity of the data that may be acquired by the master device.

In this embodiment, the Bluetooth system may also support a low power consumption mode with lower power consumption as to the normal working mode.

When the communication between the Bluetooth system and the data source device is good, the integrity of the data received the master device and the slave device is good. In this case, during a portion of the time in the second working mode, the Bluetooth system may be switched to the low power consumption mode to lower entire power consumption and prolong endurance time of the device.

The low power consumption mode refers to an energy conservation mode of Bluetooth, and achieves the objective of saving power by virtue of a specific working mode in the premise of not affecting use. The commonly used energy conservation modes include a sniff mode, a hold mode, a park mode and the like. In this embodiment, the low power consumption mode may be the sniff mode.

Figure 3:
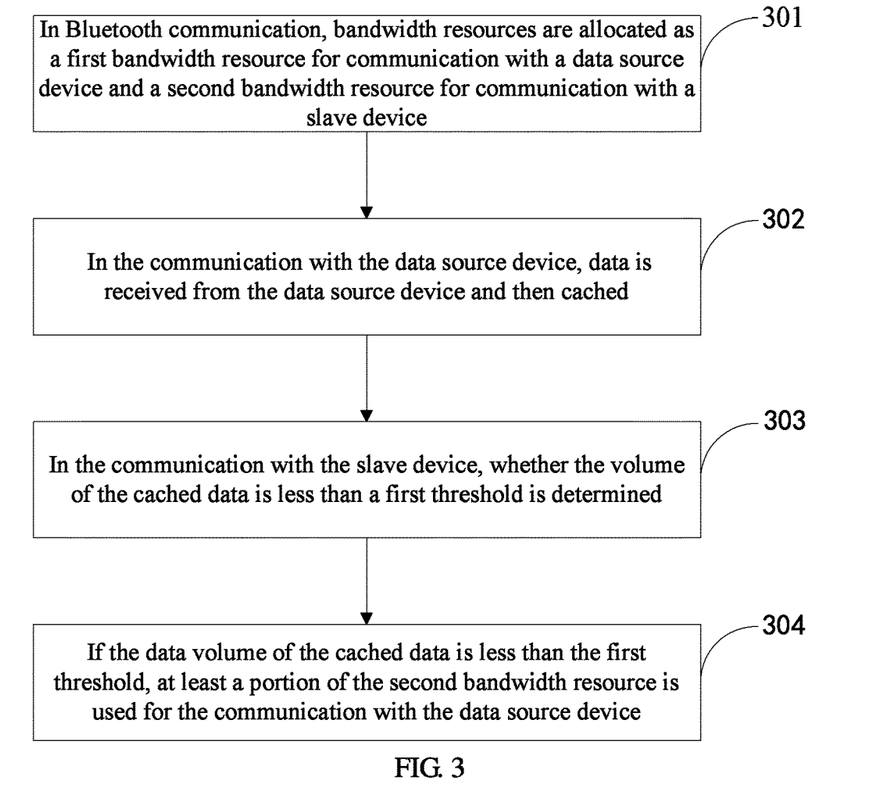
FIG. 3 is a flowchart of a method for Bluetooth communication according to an embodiment of the present disclosure.

FIG. 3 is a flowchart of a method for Bluetooth communication capable of implementing dynamic adjustment according to an embodiment of the present disclosure. The method may be performed by a master device in the Bluetooth system. As illustrated in FIG. 2, the master device may perform the following steps:

301: In Bluetooth communication, bandwidth resources are allocated as a first bandwidth resource for communication with a data source device and a second bandwidth resource for communication with a slave device.

The first bandwidth resource and the second bandwidth resource may be set to specifically any suitable predetermined value. For example, the first bandwidth resource and the second bandwidth resource are both set to 50%.

In some embodiments, the bandwidth resources may be a ratio of time for implementing corresponding functions by using the Bluetooth communication module of the master device. For example, in the Bluetooth communication, the Bluetooth communication module takes a half of the time to communicate with the data source device, and takes the remaining half of the time to communicate with the slave device.

302: In the communication with the data source device, data is received from the data source device and then cached. As described above, in the communication with the data source device, the master device receives, using the Bluetooth transmission protocol, the data sent by the data source device and caches the received data. The communication between the master device and the data source device is a two-way communication process, and retransmission, handshake and the like mechanisms may be employed to ensure integrity of the data acquired by the master device.

303: In the communication with the slave device, whether the volume of the cached data is less than a first threshold is determined.

A person skilled in the art would understand that the volume of the data cached in the master device may to some extent represent communication status between the master device and the data source device. For example, when the data source device is far away from the master device, and the communication quality is poor, the probability that the data source device needs to retransmit data packets is high. Therefore, within a specific time period, the volume of the data cached or accumulated by the master device may be less.

In this embodiment, the first threshold may be specifically a value predetermined according to the actual needs, and is determined by the specific conditions. The first threshold is configured to ensure that the master device has a sufficient data volume.

304: If the data volume of the cached data is less than the first threshold, at least a portion of the second bandwidth resource is used for the communication with the data source device.

When the volume of the cached data is less, with respect to the entire audio playback apparatus, stability of data transmission between the master device and the data source device needs to be firstly ensured. This is because that the data integrity of the slave device is also dependent on the data packets forwarded by the master device.

When the cached data is less than the first threshold, the bandwidth resource originally allocated for the communication with the slave device may be readjusted, and more bandwidth resources may be allocated to the master device, such that the master device and the data source device may still ensure a sufficient data transmission volume even in a poor communication state.

The specific manners of readjustment and allocation may be terminating the communication with the slave device and switching to the communication with the data source device.

In a specific embodiment of the present disclosure, the communication status between the master device and the data source device may be determined using the volume of the data cached by the master device as a judgment criterion. When the communication status is poor, the Bluetooth bandwidth resources are automatically mostly allocated to the communication between the master device and the data source device, to accommodate different scenarios. In this way, the effects such as increasing the communication distance between the master device and the data source device may be achieved, such that the master device has performance satisfying use requirements in various different application environments.

Figure 4:
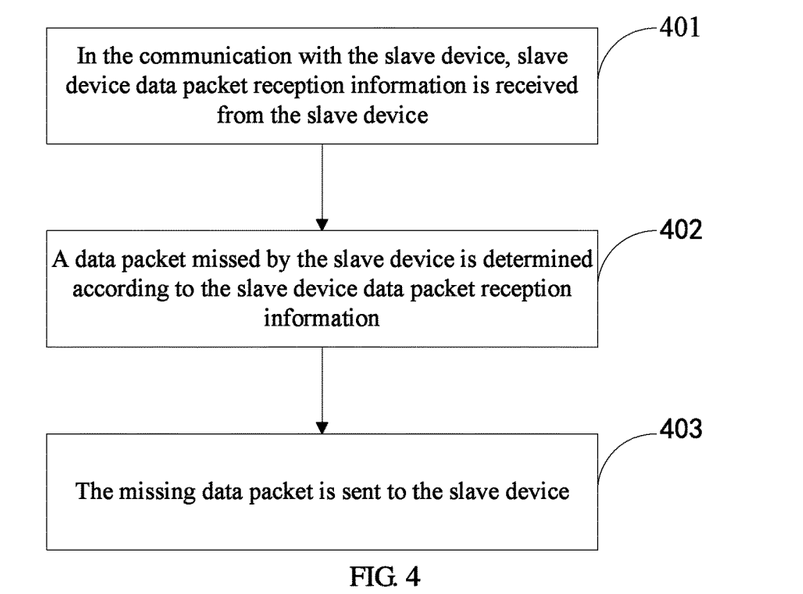
FIG. 4 is a flowchart of a method for Bluetooth communication according to another embodiment of the present disclosure.

In another embodiment, before whether the volume of the cached data less than the first threshold is determined, as illustrated in FIG. 4, the method further includes the following steps:

401: In the communication with the slave device, slave device data packet reception information is received from the slave device.

The slave device data packet reception information refers to information of the data packets recorded and received by the slave device, which includes serial numbers of the received data packets, the serial number of the currently received data packet and the like.

402: A data packet missed by the slave device is determined according to the slave device data packet reception information.

In the communication, the data packets received by the master device may be considered to be complete, and the master device may determine the data packet missed by the slave device in the data interception according to the data packets received by the slave device. For example, when the serial numbers of two adjacent data packets are not contiguous, it may be determined that the slave device misses the data packet between the two non-contiguous serial numbers; or when the serial number of the current data packet of the master device is different from the serial number of the current data packet of the slaved device, it may be determined that the slave device misses the data packet between the two data packets.

403: The missing data packet is sent to the slave device. The master device may complete the above information exchange via some bottom-layer instructions (for example, LMP instructions), and forward the missing data packets to ensure data integrity of the slave device in the communication with the slave device.

In the Bluetooth communication method according to the embodiment of the present disclosure, the power consumption of the device may be further lowered by switching to the low power consumption state. Specifically, the conditions of switching to the low power consumption state are as follows: it is determined that the slave device has no missing data packet according to the slave device data packet reception information and the volume of the cached data is greater than the first threshold.

If the above conditions are satisfied, it indicates that during this time period, the master device, the slave device and the data source device are all in good communication. Therefore, when it comes to a balance between data communication and power consumption, it is an intention to save power.

In this embodiment, when the master device satisfies the conditions of switching to the low power consumption state, in communication between the master device and the slave device, the master device and the slave device both switch to the sniff mode, so as to lower power consumption of the Bluetooth device and to prolong endurance time of the device.

According to the disclosure in the above method embodiment, it may be understood that in the application scenario as illustrated in FIG. 1, the following four different scenarios may be involved.

Scenario 1: The volume of the data cached in the master device is greater than the first threshold, and the slave device has no missing data packet.

Scenario 2: The volume of the data cached in the master device is greater than the first threshold, and the slave device has a missing data packet.

Scenario 3: The volume of the data cached in the master device is less than the first threshold, and the slave device has a missing data packet.

Scenario 4: The volume of the data cached in the master device is less than the first threshold, and the slave device has no missing data packet.

With respect to the above four different scenarios, the second bandwidth resource allocated to the master device for communication with the slave device may be adjusted to provide better performance.

Figure 5:
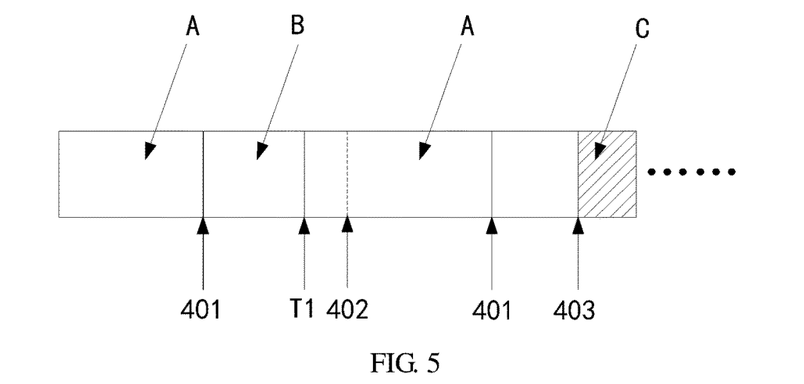
FIG. 5 is a schematic diagram of bandwidth allocation according to an embodiment of the present disclosure.

Hereinafter with reference to the bandwidth allocation diagram as illustrated in FIG. 5, the above different scenarios are described in detail. In the embodiment as illustrated in FIG. 5, the bandwidth resources are allocated by using the Bluetooth communication module in a time-sharing manner.

As illustrated in FIG. 5, in Bluetooth communication, a first time node 401, a second time node 402 and a switching node 403 are predetermined.

The first time node 401 is the time when the communication with the data source device switches to the communication with the slave device, the second time node 402 is the time when the communication with the slave device switches to the communication with the data source device, and the switching node 403 is the time when the master device switches to the sniff node.

As such, the period between the second time node 402 and the first time node 401 is the time (represented by state A in FIG. 4) for communication with the data source device. The period between the first time node 401 and a next second time node 402 is the time (represented by state B in FIG. 4) for communication with the slave device. The period between the switching node 403 and the second time node 402 is the low power consumption mode (represented by state C in FIG. 4).

With respect to different scenarios, the bandwidth resources are adaptively allocated by adjusting the locations of the second time node 402 and the switching node 403.

For example, in scenario 1, the condition of switching to the low power consumption state is satisfied, the location of the switching node 403 is the current time, and the master device and the slave device are enabled to switch to the sniff mode (that is, state C) to lower the power consumption of the Bluetooth device. In scenario 2, the master device and the slave device maintain state B, and the master device forwards the data packet to the slave device to maintain data integrity of the slave device.

In scenario 3, the master device and the slave device are also enabled to maintain state B, and the missing data packet is preferentially forwarded to ensure sufficient integrity of the data of the slave device. In scenario 4, the second time node 402 may be pushed ahead to time T1 when it is determined that the volume of the cached data is less than the first threshold, such that the ratio relationship between state A and state B is changed. In other words, allocation of the Bluetooth bandwidth resources is adjusted.

As illustrated in FIG. 5, different states of the Bluetooth communication module are constantly switched. Depending on different scenarios occurred in the communication, states or state relationships vary accordingly.

Figure 6:
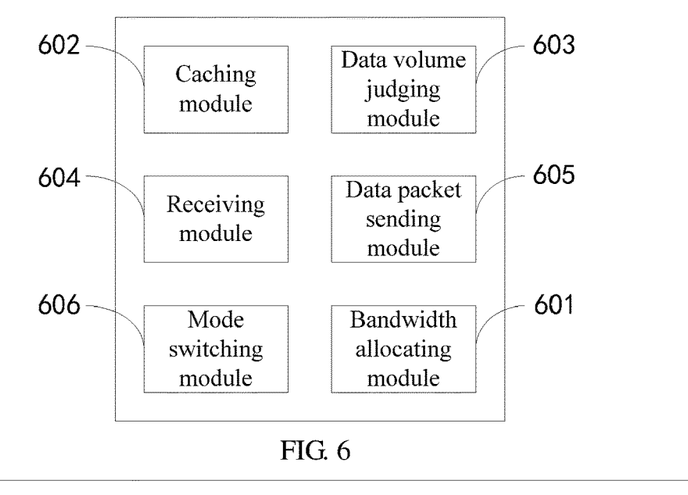
FIG. 6 is a functional block diagram of an apparatus for Bluetooth communication according to an embodiment of the present disclosure.

FIG. 6 is a functional block diagram of a Bluetooth communication apparatus executed in a master device according to an embodiment of the present disclosure. As illustrated in FIG. 6, the Bluetooth communication apparatus includes: a bandwidth allocating module 601, a caching module 602 and a data volume judging module 603.

The bandwidth allocating module 601 is configured to, in a Bluetooth communication process, allocate bandwidth resources as a first bandwidth resource for communication with a data source device and a second bandwidth resource for communication with a slave device. The caching module 602 is configured to, in the communication with the data source device, receive and cache data from the data source device. The data volume judging module 603 is configured to, in the communication with the slave device, determined whether the volume of the cached data is less than a first threshold.

The bandwidth allocating module 601 is further configured to, if the data volume of the cached data is less than the first threshold, use at least a portion of the second bandwidth resource for the communication with the data source device.

In another embodiment, to ensure data integrity of the slave device, corresponding data is forwarded to the slave device. As illustrated in FIG. 6, the Bluetooth communication apparatus may further include: a receiving module 604 and a data packet sending module 605.

The receiving module 604 is configured to, in the communication with the slave device, receive slave device data packet reception information from the slave device. The data packet sending module 605 is configured to determine a data packet missed by the slave device according to the slave device data packet reception information, and send the missing data packet to the slave device.

In some embodiments, the audio playback apparatus where the master device/slave device are configured may be in good communication with the data source device. Therefore, a mode switching module 606 may be further configured, such that in communication between the master device/slave device, the device switches to a low power consumption mode to save power and reduce power consumption if the conditions are satisfied.

It should be noted that since the apparatus embodiments and the method embodiments are based on the same inventive concept, and technical contents in the method embodiments may also be applied to the apparatus embodiments, which are thus not described herein any further.

Figure 7:
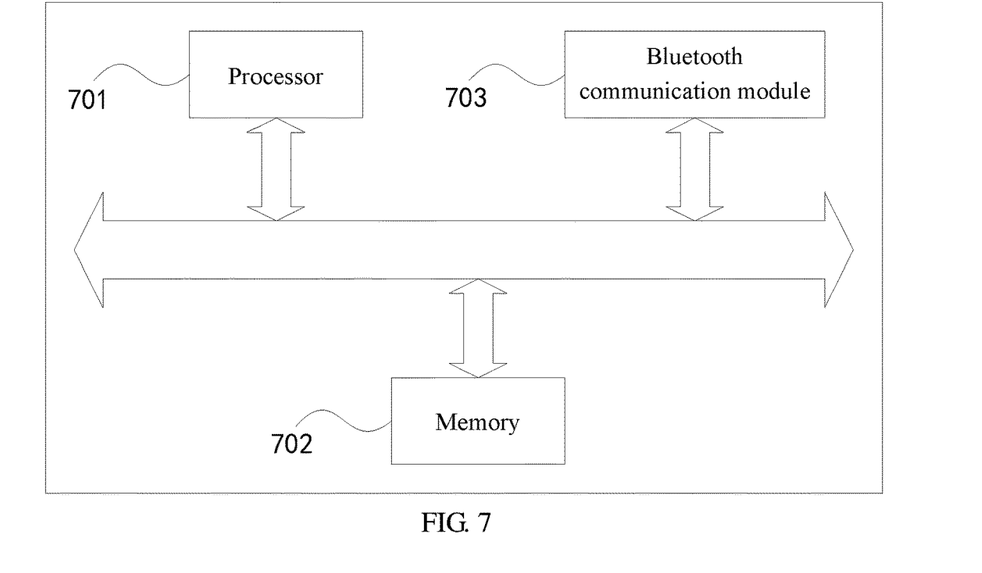
FIG. 7 is a structural block diagram of a Bluetooth device according to an embodiment of the present disclosure.

FIG. 7 is a schematic structural diagram of a Bluetooth device 700 including a first audio playback device and a second audio playback device according to an embodiment of the present disclosure. As illustrated in FIG. 7, the Bluetooth device 700 includes: at least one processor 701, a memory 702 and a Bluetooth communication module 703. FIG. 7 illustrates one processor 701 as an example. In some embodiments, the electronic device may further include an input apparatus and an output apparatus.

The processor 701, the memory 702, the Bluetooth communication module 703, the input apparatus and the output apparatus may be connected to each other via a bus or in another manner. FIG. 7 uses connection via a bus as an example for description.

The memory 702, as a non-volatile computer readable storage medium, may be configured to store non-volatile software programs, non-volatile computer executable programs and modules, for example, the program instructions/modules corresponding to the Bluetooth communication methods in the embodiments of the present application (for example, the bandwidth allocating module 601, the caching module 602 and the data volume judging module 603 as illustrated in FIG. 6). The non-volatile software programs, instructions and modules stored in the memory 701, when being executed, cause the processor 702 to perform various function applications and data processing of a server, and perform the Bluetooth communication methods in the above method embodiments via the Bluetooth communication module 703.

The memory 702 may include a program memory area and data memory area, wherein the program memory area may store operation systems and application programs needed by at least function; and the data memory area may store data created according to the use of the Bluetooth communication apparatus. In addition, the memory 702 may include a high speed random access memory, or include a non-volatile memory, for example, at least one disk storage device, a flash memory device, or another non-volatile solid storage device.

In some embodiments, the memory 702 optionally includes memories remotely configured relative to the processor 701. These memories may be connected to a Bluetooth communication apparatus over a network. The above examples include, but not limited to, the Internet, Intranet, local area network, mobile communication network and a combination thereof.

The input apparatus 903 may receive input digital or character information, and generate signal input related to user settings and function control of the apparatus for forwarding Bluetooth data. The output apparatus may include a display screen or the like display device. The one or more modules are stored in the memory 702, and when being executed by the at least one processor 701, the one or more modules perform the Bluetooth communication method in any of the above method embodiments.

A person skilled in the art should be further aware that with reference to the embodiments of the present disclosure disclosed herein, various exemplary Bluetooth communication steps may be implemented in the form of electronic hardware, computer software or a combination thereof. To clearly describe interchangeability between the hardware and software, the above description has generally illustrates the compositions and steps of the various example according to the functions. Whether such functions are implemented in the form of software or hardware depends on the specific application and the design restrictions applied to the entire system.

A person skilled in the art may implement the described functions by using different methods for each specific application. However, such implementation shall not be deemed as going beyond the scope of the present disclosure. The computer software program may be stored in a computer readable storage medium, wherein the computer software program, when being executed, may perform the steps and processes according to the above method embodiments. The storage medium may be any medium capable of storing program codes, such as read-only memory (ROM), a random access memory (RAM), a magnetic disk, or a compact disc-read only memory (CD-ROM).

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A method for Bluetooth communication, comprising:
   in Bluetooth communication, allocating bandwidth resources as a first bandwidth resource for communication with a data source device and a second bandwidth resource for communication with a slave device;
   in the communication with the data source device, receiving and caching data from the data source device;
   in the communication with the slave device, determining whether the volume of the cached data is less than a first threshold; and
   if the data volume of the cached data is less than the first threshold, using at least a portion of the second bandwidth resource for the communication with the data source device.

2. The method according to claim 1, further comprising:
   in the communication with the slave device, receiving slave device data packet reception information from the slave device;
   determining a data packet missed by the slave device according to the slave device data packet reception information; and
   sending the missing data packet to the slave device.

3. The method according to claim 2, further comprising:
   switching to a low power consumption mode when the slave device has no missing data packet and the volume of the cached data is greater than the first threshold.

4. The method according to claim 1, wherein the allocating bandwidth resources as a first bandwidth resource for communication with a data source device and a second bandwidth resource for communication with a slave device comprises:
   in the Bluetooth communication, predetermining a first time node and a second time node, the first time node being the time when the communication with the data source device switches to the communication with the slave device, and the second time node being the time when the communication with the slave device switches to the communication with the data source device; and
   wherein the using at least a portion of the second bandwidth resource for the communication with the data source device comprises: putting ahead the second time node to the time when the volume of the cached data is less than the first threshold.

5. The method according to claim 4, further comprising:
   switching to a low power consumption mode when the slave device has no missing data packet and the volume of the cached data is greater than the first threshold;
   at the second time node, switching from the low power consumption mode to the communication with the data source device.

6. An electronic device, comprising:
   a memory, a communication module and a processor coupled to the memory and the communication module;
   the memory storing instructions that are executable by the processor, wherein execution of the instructions by the processor causes the processor via the communication module to:
   allocate bandwidth resources as a first bandwidth resource for communication with a data source device and a second bandwidth resource for communication with a slave device, in Bluetooth communication;
   receive and cache data from the data source device, in the communication with the data source device;
   determine whether the volume of the cached data is less than a first threshold, in the communication with the slave device;
   if the data volume of the cached data is less than the first threshold, use at least a portion of the second bandwidth resource for the communication with the data source device;
   wherein the allocating bandwidth resources as a first bandwidth resource for communication with a data source device and a second bandwidth resource for communication with a slave device comprises:

in the Bluetooth communication, predetermining a first time node and a second time node, the first time node being the time when the communication with the data source device switches to the communication with the slave device, and the second time node being the time when the communication with the slave device switches to the communication with the data source device; and wherein the using at least a portion of the second bandwidth resource for the communication with the data source device comprises: putting ahead the second time node to the time when the volume of the cached data is less than the first threshold.

7. The electronic device according to claim 6, wherein execution of the instructions by the processor further causes the processor to:

receive slave device data packet reception information from the slave device, in the communication with the slave device;

determine a data packet missed by the slave device according to the slave device data packet reception information; and send the missing data packet to the slave device.

8. The electronic device according to claim 7, wherein execution of the instructions by the processor further causes the processor to:

switch to a low power consumption mode when the slave device has no missing data packet and the volume of the cached data is greater than the first threshold.

9. The electronic device according to claim 8, wherein execution of the instructions by the processor further causes the processor to:

switch to a low power consumption mode when the slave device has no missing data packet and the volume of the cached data is greater than the first threshold;

at the second time node, switch from the low power consumption mode to the communication with the data source device.

10. A Bluetooth system, comprising a master device and a slave device; the master device needing to be multiplexed in a time-sharing manner, wherein in one portion of time of Bluetooth communication, the slave device is configured to acquire data from a data source device by means of data interception, the master device is configured to be connected via Bluetooth, and receive and cache the data from the data source device, which is a first period of Bluetooth communication;

in another portion of time of the Bluetooth communication, the master device is configured to establish a Bluetooth connection with the slave device for receiving slave device data packet reception information from the slave device and send the missing data packet that is determined by the slave device data packet reception information, which is a second period of Bluetooth communication;

the master device is configured to determine whether the volume of the cached data is less than a first threshold; and if the data volume of the cached data is less than the first threshold, lengthen the first period by shortened the second period.

11. The system according to claim 10, wherein at the second period of the Bluetooth communication, the master device is configured to determine whether the volume of the cached data is less than the first threshold when the slave device has no missing data packet; and the master device and the slave device both switch to a low power consumption mode if the volume of the cached data is less than the first threshold.

* * * * *